United States Patent [19]

Saitoh et al.

[11] Patent Number: 5,039,328
[45] Date of Patent: Aug. 13, 1991

[54] PROCESS FOR PRODUCING A GRANULAR SLOW-ACTING NITROGENOUS FERTILIZER

[75] Inventors: Hisato Saitoh; Noboru Abe; Takahiro Watanuki, all of Machida, Japan

[73] Assignee: Mitsubishi Kasei Corporation, Tokyo, Japan

[21] Appl. No.: 476,570

[22] Filed: Feb. 7, 1990

[30] Foreign Application Priority Data

Feb. 14, 1989 [JP] Japan .................................. 1-34226

[51] Int. Cl.$^5$ ............................ C05C 9/00; C05C 9/02
[52] U.S. Cl. ......................................... 71/28; 71/64.05; 71/64.06; 71/64.07; 71/64.11
[58] Field of Search ........................... 71/1, 11, 27–30, 71/903, 64.05, 64.07, 64.11

[56] References Cited

U.S. PATENT DOCUMENTS 3,441,539  4/1969  Schafer et al. ..................... 71/28 X
3,870,755  3/1975  Kamo et al. ......................... 260/553
4,283,219  8/1981  Wagner et al. .......................... 71/28

FOREIGN PATENT DOCUMENTS 33189X     3/1976  Japan .
87136     10/1980  Japan .
89252     10/1980  Japan .
61-078173  2/1986  Japan .

OTHER PUBLICATIONS

CA88(13):88444v, Slow Acting Fertilizers, 1977, Beglov et al.

Primary Examiner—Ferris H. Lander
Attorney, Agent, or Firm—Oblon, Spivak, McClelland, Maier & Neustadt

[57] ABSTRACT

A process for producing a granular slow-acting nitrogenous fertilizer, which comprises blending an aqueous methylol urea solution to a urea-isobutyraldehyde condensate powder or a mixture thereof with a urea-formaldehyde condensate powder, and granulating the resulting blend while subjecting the methylol urea to dehydration condensation under an acidic condition to form a urea-formaldehyde condensate.

23 Claims, 3 Drawing Sheets

PROCESS FOR PRODUCING A GRANULAR SLOW-ACTING NITROGENOUS FERTILIZER

BACKGROUND OF THE INVENTION

1. Field of the Invention

The present invention relates to a process for producing a granular slow-acting nitrogenous fertilizer. More particularly, it relates to a process for producing a granular slow-acting nitrogenous fertilizer excellent in the fertilizer physical properties and fertilizing effects using an urea-isobutyraldehyde condensate.

2. Discussion of Background

In application of a fast-acting nitrogenous fertilizer, it has been common to employ a method wherein the necessary amount thereof is divided and applied in a few times in order to avoid adverse effects of high nitrogen concentration to plants or to improve the nitrogen utilization efficiency. Whereas, a slow-acting nitrogenous fertilizer such as a urea-isobutyraldehyde condensate (e.g. isobutylidene diurea) is hardly soluble in water, and it is gradually decomposed to inorganic nitrogen in soil and utilized by plants in the form of inorganic nitrogen, whereby adverse effects to plant due to high nitrogen concentration are scarcely brought about, and the necessary amount can be applied all at once. Further, it has a merit that the utilization efficiency by plants is high, since leaching or run-off scarcely occurs. Thus, the slow-acting nitrogenous fertilizer such as an isobutylidene diurea is an excellent fertilizer in that the application is easy as compared with a fast-acting nitrogenous fertilizer, it is economically advantageous that the utilization efficiency by plants is high, and it is thereby possible to prevent environmental pollution.

As a method for preparing this isobutylidene diurea, it is known to react, for example, 2 mols of solid urea and 1 mol of isobutyraldehyde using an inorganic acid as a catalyst in a substantially sealed reactor under stirring while maintaining the urea in the solid phase (U.S. Pat. No. 3,870,755). This method is industrially advantageous, since the reaction product is obtainable in the form of powder particles (particle size: fine powder to a few mm). However, it has a drawback that a urea-isobutyraldehyde condensate powder having a particle size of not larger than 1 mm is produced in a substantial amount. The urea-isobutyraldehyde condensate having a small particle size has the following drawbacks. Namely, the smaller the particle size, the larger the hydrolyzing rate, and the more readily it is decomposed to inorganic nitrogen in soil, whereby the function as a slow-acting nitrogenous fertilizer can not adequately be performed. Further, the urea-isobutyraldehyde condensate having a small particle size brings about disadvantage in handling such that the flowability is poor, dusting or scattering is likely to take place at the time of application, and the hydrophilic nature is low and its application to water is difficult.

Japanese Examined Patent Publication No. 57845/1986 discloses a method for producing a urea-$C_4$ saturated aliphatic aldehyde condensate powder particles whereby formation of a powder having a small particle size is suppressed. This publication discloses a method wherein solid urea, a certain specific amount of a $C_4$ saturated aliphatic aldehyde and a certain specific amount of formaldehyde are supplied continuously to a reactor, and the urea, the $C_4$ saturated aliphatic aldehyde and the formaldehyde are reacted in the presence of an inorganic acid.

Further, Japanese Examined Patent Publication No. 4935/1983 discloses a method for producing a urea-$C_4$ saturated aliphatic aldehyde condensate which comprises continuously supplying solid urea to a reactor and reacting the urea in the solid phase with a $C_4$ saturated aliphatic aldehyde in the presence of an inorganic acid, wherein a urea-formaldehyde condensate polycondensable under an acidic condition is supplied to the reactor. By these methods, it is possible to suppress formation of a powder having a particle size of less than 1 mm to some extent. However, the rate of formation is still as high as from about 15 to 50%, which is not satisfactory.

On the other hand, Japanese Unexamined Patent Publication No. 26585/1986 relates to an aggregate fertilizer comprising (A) a hardly soluble granular fertilizer and (B) a solidified product obtained by reacting urea and formaldehyde in a formalin solution having urea dissolved therein, wherein said hardly soluble granular fertilizer is dispersed and contained in said solidified product. Specifically, it discloses a method wherein, for example, a coated ammonium nitrate potash fertilizer covered with concentrated phospholic acid, is filled in an ice-forming tray, then a formalin solution having urea dissolved therein under heating, is poured, and the addition condensation reaction of urea and formaldehyde is conducted to obtain an aggregate fertilizer of a truncated quadrangular pyramid shape. However, the hardly soluble granular fertilizer as the starting material of such an aggregate fertilizer is required to have a particle size so that when the ureaformalin solution is mixed with the granular fertilizer, the solution should be able to pass through spaces among particles to contact all the particles uniformly. Specifically, the particle size is required to be about 1 mm or larger, and there is no disclosure of using a urea-$C_4$ saturated aliphatic aldehyde condensate of a powder form as the starting material. Further, said publication relating to an aggregate fertilizer does not disclose a so-called reaction granulation wherein granulation is conducted while reacting the starting materials.

On the other hand, with respect to the granulation of urea and a $C_4$ saturated aliphatic aldehyde condensate powder or small granules, Japanese Examined Patent Publication No. 22899/1979 discloses a method for producing a slow-acting granular nitrogenous fertilizer, which comprises heating and granulating a powder or small granules of a condensate of urea with a $C_4$ saturated aliphatic aldehyde in the presence of an inorganic acid and a $C_4$ saturated aliphatic aldehyde. This method is an effective method for granulating a powder or small granules of a condensate of urea with a $C_4$ saturated aliphatic aldehyde. However, the $C_4$ saturated aliphatic aldehyde is inflammable, and the reaction is required to be conducted in a closed system. Thus, the method requires a cumbersome means, and the granular fertilizer thereby obtained is not fully satisfactory with respect to the fertilizer physical properties such as the hardness, particle size and shape of the granules.

The present invention has been accomplished in view of the above circumstances. It is an object of the present invention to provide a process for producing a granular slow-acting nitrogenous fertilizer having sufficient hardness by using a powder which is produced in a large amount during the production of a urea-isobutyraldehyde condensate, as the starting material.

The present inventors have conducted a study to convert a urea-isobutyraldehyde condensate powder to a useful slow acting nitrogenous fertilizer. As a result, it has been found that when water is used as a binder, as is commonly employed for a usual granular fertilizer, the granulated product is inadequate in the hardness and brittle and thus has a drawback that it readily disintegrates into a powder, whereas when methylol urea is used as a binder and granulation is conducted while subjecting the methylol urea to dehydration condensation, it is possible to obtain a granular fertilizer which is extremely useful as a slow-acting fertilizer having sufficient hardness and an adequately slow rate for conversion to inorganic nitrogen.

Thus, the present invention provides a process for producing a granular slow-acting nitrogenous fertilizer, which comprises blending an aqueous methylol urea solution to a urea-isobutyraldehyde condensate powder or a mixture thereof with a urea-formaldehyde condensate powder, and granulating the resulting blend while subjecting the methylol urea to dehydration condensation under an acidic condition to form a urea-formaldehyde condensate.

DETAILED DESCRIPTION OF THE PREFERRED EMBODIMENTS

Figure 1:
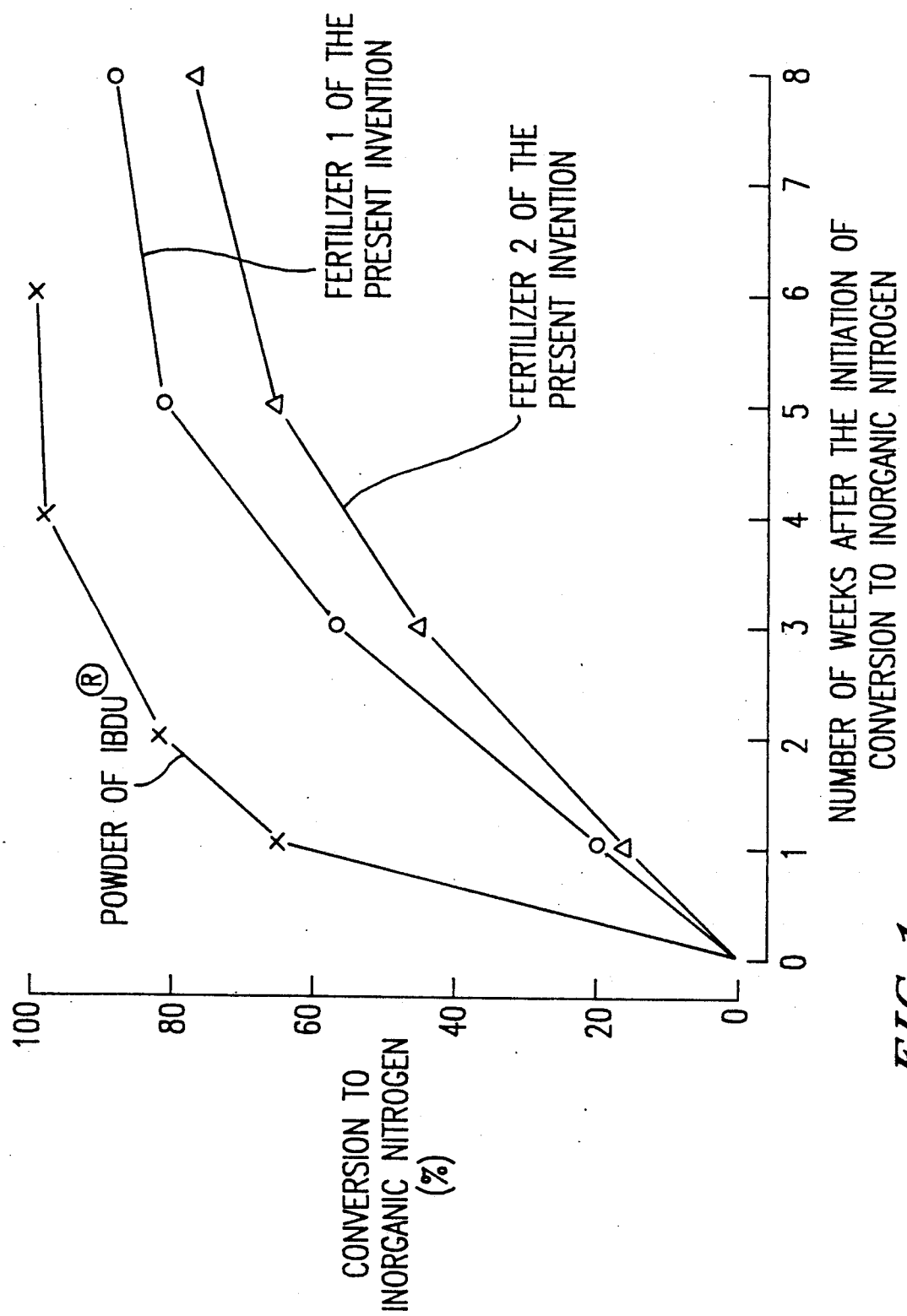
FIG. 1 is a graph showing the results of a test for conversion of nitrogen in a fertilizer to inorganic nitrogen under a paddy field condition.

The urea-isobutyraldehyde condensate powder to be used in the present invention, may be the one produced by a conventional method. In some cases, the powder is sieved, for example, by a screen to remove particles having a large particle size. The urea-isobutyraldehyde condensate powder usually has a particle size of not large than 1 mm, preferably not larger than 0.7 mm, more preferably not larger than 0.5 mm.

On the other hand, the methylol urea to be used in the present invention is a product of an addition reaction of urea with formaldehyde and may be the one produced by a conventional method. The methylol urea is preferably in the form of an aqueous solution. When urea and formaldehyde are reacted in the presence of water in an aqueous solution state under the following conditions, the yield of methylol urea thereby obtained is high. Besides, a condensate obtainable by subjecting the resulting methylol urea solution to dehydration condensation under an acidic condition, has high fertilizing effects. Also in the present invention, when an aqueous methylol urea solution obtained under such conditions is employed, a granular fertilizer having high fertilizing effects can be obtained.

Total concentration of urea and formaldehyde in the reaction system: 50-90% by weight; Molar ratio of urea to formaldehyde: 1-2; pH: 8-10; Reaction temperature: 40°-80° C.

At the time of reacting urea and formaldehyde, it is preferred to add an alkaline substance such as a condensed phosphate, borax, sodium hydroxide or potassium hydroxide in an amount of from about 0.5 to 9% by weight relative to the formaldehyde to control the pH during the reaction.

In the process for producing a granular slow-acting nitrogenous fertilizer of the present invention, the methylol urea is used usually in an amount of from 3 to 45% by weight, preferably from 5 to 25% by weight, relative to the urea-isobutyraldehyde powder. Further, the methylol urea is used in such an amount that the amount of the nitrogen derived from the methylol urea is usually from 3 to 30% by weight, preferably from 5 to 20% by weight, relative to the total nitrogen in the fertilizer obtained by the process of the present invention.

In the present invention, a urea-formaldehyde condensate powder having a particle size of not larger than 1 mm, preferably not larger than 0.7 mm, more preferably not larger than 0.5 mm, may be incorporated to the urea-isobutyraldehyde condensate powder, as the case requires. The proportion of such incorporation is optional. However, it is usual that the proportion (the weight ratio) of the nitrogen derived from the urea-formaldehyde condensate powder to the nitrogen derived from the urea-isobutyraldehyde condensate powder is not more than 1, preferably not more than 0.3. As the urea-formaldehyde condensate to be added, it is preferred to employ the one having high fertilizing effects by itself, so that a granular fertilizer having high fertilizing effects can be obtained. It is usual to employ the one having an A.I. value of at least 40%, preferably at least 50%. Here, A.I. value is a value useful as an index of the effective degree of the nitrogen in the urea-formaldehyde condensate, as the slow-acting nitrogen, and it is calculated by the following equation.

$$A.I.\ value = [(\text{cold water-insoluble nitrogen} - \text{hot buffer solution-insoluble nitrogen})/\text{cold water-insoluble nitrogen}] \times 100$$

When the urea-formaldehyde condensate powder is mixed to the urea-isobutyraldehyde condensate powder, the methylol urea is used in an amount of from 3 to 45% by weight, preferably from 5 to 25% by weight, relative to the material to be granulated i.e. the mixture of the urea-isobutyraldehyde condensate powder and the urea-formaldehyde condensate powder. Further, the methylol urea is used in an amount such that the amount of the nitrogen derived from the methylol urea is from 3 to 30% by weight, preferably from 5 to 20% by weight, to the total amount of nitrogen in the fertilizer obtained by the process of the present invention.

In the present invention, an aqueous methylol urea solution is blended to the urea-isobutyraldehyde condensate powder or a mixture thereof with a urea-formaldehyde condensate powder, and the resulting blend is granulated while the methylol urea is subjected to dehydration condensation under an acidic condition to form a urea-formaldehyde condensate.

Namely, in the present invention, the formation of the urea-formaldehyde condensate by the dehydration condensation reaction of methylol urea and granulation of the mixture of the urea-formaldehyde condensate and the urea-isobutyraldehyde condensate powder, are simultaneously conducted in the same system.

There is no particular restriction as to the method of blending the urea-isobutyraldehyde condensate powder or the mixture thereof with a urea-formaldehyde condensate powder, and the aqueous methylol urea solution. However, in order to efficiently conduct the granulation, it is usually preferred to granulate the blend while spraying and blending the aqueous methylol urea to the urea-isobutyraldehyde condensate powder or the mixture thereof with a urea-formaldehyde condensate powder. In case where the viscosity of the methylol urea solution is so high that it is difficult to spray the solution, the methylol urea solution may be heated or diluted with water, as the case requires.

Further, when the dehydration condensation reaction of the methylol urea is conducted under an acidic condition, the reaction proceeds efficiently. Particularly when the aqueous methylol urea solution is condensed at a pH of from 4.0 to 6.5, a urea-formaldehyde condensate having very high fertilizing effects can be obtained. Therefore, the pH of the reaction granulation system (the blend to be granulated) is preferably from 4.0 to 6.5. Accordingly, it is necessary to add an acidic substance to the reaction granulation system. Usually, an inorganic acid such as sulfuric acid or phosphoric acid, or an organic acid such as citric acid is used. It is preferred to use phosphoric acid or citric acid which has a buffering effect at a pH of from 4.0 to 6.5. In order to uniformly disperse the acidic substance in the reaction granulation system, such an acidic substance is used in the form of an aqueous solution having a concentration of from 1 to 60% by weight, preferably from 10 to 50% by weight. The amount of the acidic substance is preferably an amount sufficient to bring the pH of the reaction granulation system to a level of from 4.0 to 6.5. Further, the pH of the methylol urea solution is influenced by the pH of the material to be granulated such as the urea-isobutyraldehyde condensate powder. Therefore, the amount of the acidic substance may be increased or reduced as the case requires. There is no particular restriction as to the manner for adding the acidic substance. It may be mixed preliminarily to the aqueous methylol urea solution, or it may be added by spraying during the granulation. However, if it is mixed preliminarily to the aqueous methylol urea solution, it is likely that the dehydration condensation of the methylol urea proceeds. In that case, therefore, it is preferred to mix it immediately prior to the granulation.

In order to disperse the acidic substance well and to conduct the reaction granulation well, it is preferred to spray and blend its aqueous solution and the aqueous methylol urea solution separately during the granulation.

To obtain a desired slow-acting granular nitrogenous fertilizer in accordance with the process of the present invention, it is particularly preferred to employ a granulator whereby a compression stress is exerted to particles particularly by rolling the particles during the granulation. As such a granulator, a rolling-type granulator whereby the granulating vessel itself rotates, such as a dish-type granulator or a drum-type granulator, or a stirring-type (agitation-type) granulator whereby stirring vanes in a granulating vessel rotate at a high speed, may be mentioned. If the rotational speed of the rotary vessel or the stirring vanes is low, the compression stress will be small, and the mechanical strength of the granules thereby obtained tends to be low. On the other hand, if the rotational speed is high, there will be drawbacks such that the granules tend to hardly grow, the granules tend to be broken, and scaling increases. Therefore, depending upon the granulation properties of the material to be granulated, the mechanical conditions influential to the compression stress of granulation should properly be set. For example, when a dish-type granulator having a diameter of 40 cm and an angle of inclination of 45° is employed, a preferred rotational speed of the granulator is from 10 to 200 r.p.m. Likewise, when a stirring-type (agitation-type) granulator having a diameter of 35 cm and a length of stirring vanes being about 35 cm, is used, the rotational speed of the vanes, may be from 100 to 700 r.p.m.

There is no particular restriction as to the temperature of the reaction granulation system during the granulation. However, in order to facilitate the dehydration condensation reaction of the methylol urea, the reaction granulation system may be heated. In such a case, a preferred temperature of the reaction granulation system is such that the temperature of the granulated product is at most 100° C., more preferably at most 80° C. As a method for the temperature raising, a method of preliminarily heating the granulator or at least one of the starting materials, or a method of suitably heating the reaction granulation system during the granulation by a heater or hot air, may be employed.

In the present invention, in order to conduct the granulation efficiently, a substance which serves as nuclei for granules, may be added to the reaction granulation system. As such a substance, a urea-isobutyraldehyde condensate or a urea-formaldehyde condensate may be employed. Otherwise, the granulated product comprising a urea-formaldehyde condensate and a urea-isobutyraldehyde condensate produced by the process of the present invention, may be used for recycling. The particle size is not particularly limited so long as it is larger than the starting material urea-isobutyraldehyde condensate powder or the urea-formaldehyde condensate powder used in the process of the present invention. It is suitably selected depending upon, for example, the granulation conditions and the desired particle size of the slow-acting granular nitrogenous fertilizer obtained by the process of the present invention.

The particle size of the granules obtained by the process of the present invention is suitably determined depending upon the particular application of the resulting fertilizer. The particle size is preferably from 0.5 to 6.0 mm. Among them, in order to obtain granules having a small particle size, starting powders having finner particle size may be employed. The particle size of the granules is more preferably from 1.5 to 4.0 mm. The control of the particle size is conducted by properly adjusting the amount and the adding speed of water incorporated to granules such as water derived from the methylol urea solution or water derived from the aqueous acidic solution, the mechanical conditions of the granulator and the granulation time.

If necessary, granules are dried after granulation. The temperature for drying is preferably from 4020 to 120° C., more preferably from 60° to 90° C.

The granulated product thus obtained is granules having a urea-isobutyraldehyde condensate having a particle size of not larger than 1 mm, preferably not larger than 0.5 mm, dispersed in a urea-formaldehyde condensate. In the granular slow-acting fertilizer of the present invention, the proportion of the nitrogen derived from the urea-formaldehyde condensate (the sum of the nitrogen derived from the methylol urea and the nitrogen derived from the urea-formaldehyde condensate powder) is preferably from 3 to 55% by weight, particularly preferably from 5 to 50% by weight, relative to the total nitrogen in the fertilizer, from the viewpoint of the fertilizing effects and the physical properties.

According to the process of the present invention, the blend is granulated while a urea-isobutyraldehyde condensate powder is present in the dehydration condensation reaction system of the methylol urea, whereby a slow-acting nitrogenous fertilizer is obtainable which is excellent in the physical properties as fertilizer such that the hardness of granules is high and the possibility of breakage is small and it has no substantial floating property in water, and which is excellent in the fertilizing effects such that as compared with the urea-isobutyraldehyde condensate powder, the effective period of the fertilizing effects is long and the leaching amount is small.

The fertilizer obtained by the process of the present invention contains both the nitrogen derived from the urea-isobutyraldehyde and the nitrogen derived from the urea-formaldehyde condensate, and accordingly the fertilizing effects are obtained in good balance for a long period of time from the initial stage of its application. Thus, it is a very useful fertilizer.

Now, the present invention will be described in further detail with reference to Examples. However, it should be understood that the present invention is by no means restricted to such specific Examples.

EXAMPLE 1

To 250 g of water, 837 g of urea and 15 g of borax were added, and the mixture was heated to 50° C. Then, 348 g of paraformaldehyde (86% concentration) was added thereto. The mixture was reacted for 60 minutes under stirring to obtain an aqueous methylol urea solution.

855 g of a powder (particle size: not larger than 0.5 mm) of IBTU ® (isobutylidene diurea, manufactured by Mitsubishi Kasei Corporation) was charged into a dish-type granulator having a diameter of 40 cm and an angle of inclination of 45°. Then, while spraying 210 g of the above aqueous methylol urea solution (isobutylidene diurea:methylol urea (weight ratio)=855:166) and 3.2 g of a 50 wt % citric acid solution, a granulation operation was conducted for about 20 minutes at room temperature at a rotational speed of 60 r.p.m. under such a condition that the pH of the reaction system was from 5.1 to 6.1, to obtain granules having a particle size of from 2 to 4 mm. The granules thus obtained was dried in air at 80° C. for 3 hours to obtain fertilizer 1 of the present invention. The nitrogen derived from the urea-formaldehyde condensate was 17.6% by weight relative to the total nitrogen in the fertilizer.

EXAMPLE 2

551 g of a powder (particle size: not larger than 0.5 mm) of IBDU ® and 294 g of an urea-formaldehyde condensate powder (particle size: not more than 0.5 mm) were mixed, and the mixture (nitrogen derived from the IBDU ® powder:nitrogen derived from the urea-formaldehyde condensate powder (weight ratio)=100:65) was charged into the same dish-type granulator as used in Example 1. While spraying 225 g of the methylol urea solution prepared in Example 1 (mixture of isobutylidene diurea and the urea-formaldehyde condensate:methylol urea (weight ratio)=845:178) and 3.4 g of a 50 wt % citric acid solution, a granulation operation was conducted in the same manner as in Example 1 so that the pH of the reaction system was from 5.4 to 6.2, to obtain granules having a particle size of 2 to 4 mm. The granules thus obtained were dried in air at 80° C. for 3 hours to obtain fertilizer 2 of the present invention. The nitrogen derived from the urea-formaldehyde condensate was 50% by weight relative to the total nitrogen in the fertilizer.

EXAMPLE 3

To 539 g of a 37 wt % formaldehyde aqueous solution, 558 g of urea and 10 g of borax were added. The mixture was heated to 50° C. under stirring, and then reacted for 60 minutes to obtain an aqueous methylol urea solution.

633 g of a powder (particle size: not larger than 0.5 mm) of IBDU ® was charged into the same dish-type granulator as used in Example 1. Then while spraying 182 g of a diluted solution of the above aqueous methylol urea solution (diluted with deionized water to a ½ weight concentration) (isobutylidene diurea:methylol urea (weight ratio)=91:9) and 3.2 g of a 25 wt % citric acid solution, a granulation operation was conducted in the same manner as in Example 1 so that the pH of the reaction system was from 5.1 to 5.9, to obtain granules having a particle size of from 2 to 4 mm. The granules thus obtained were dried in air at 80° C. for 3 hours to obtain fertilizer 3 of the present invention. The nitrogen derived from the urea-formaldehyde condensate was 10% by weight relative to the total nitrogen in the fertilizer.

EXAMPLE 4

4,000 g of a powder (particle size: not larger than 0.5 mm) of IBDU ® was charged into a stirring-type granulator (NG-350 model, manufactured by Daiwa Kakoki K.K.). While spraying 760 g of the aqueous methylol urea solution prepared in the same manner as in Example 1 (isobutylidene diurea:methylol urea (weight ratio)=87:13) and 11.6 g of a 50 wt % citric acid solution, a granulation operation was conducted for about 20 minutes at room temperature at a rotational speed of stirring vanes being 300±50 r.p.m. under such a condition that the pH of the reaction system was from 5.1 to 6.0, to obtain granules having a particle size of from 2 to 4 mm. The granules thus obtained were dried in air at 80° C. for 3 hours to obtain fertilizer 4 of the present invention.

The nitrogen derived from the urea formaldehyde condensate was 14% by weight relative to the total nitrogen in the fertilizer.

EXAMPLE 5

1,000 g of a granule product (particle size: 2.0–3.0 mm of IBDU ® was charged into the same stirring-type granulator as used in Example 4. While gradually adding 3,000 g of a powder (particle size: not larger than 0.5 mm) of IBDU ® and while spraying 767 g of the aqueous methylol urea solution prepared in the same manner as in Example 1 (isobutylidene diurea:methylol urea (weight ratio)=87:13) and 11.6 g of a 50 wt % citric acid solution, a granulation operation was conducted for about 9 minutes at room temperature at a rotational speed of stirring vanes being 300±50 r.p.m. under such a condition that the pH of the reaction system was from 5.1 to 6.0, to obtain granules having a particle size of from 2 to 4 mm. The granules thus obtained were dried in air at 80° C. for 3 hours to obtain fertilizer 5 of the present invention.

The nitrogen derived from the urea-formaldehyde condensate was 14% by weight relative to the total nitrogen in the fertilizer.

COMPARATIVE EXAMPLE 1

1,000 g of a powder (particle size: not larger than 0.5 mm) of IBDU ® was charged into the same dish-type granulator as used in Example 1. While spraying 220 g of water, a granulation operation was conducted in the same manner as in Example 1, to obtain granules having a particle size of from 2 to 4 mm. The granules thus obtained were dried in air at 80° C. for 3 hours to obtain comparative fertilizer 1.

COMPARATIVE EXAMPLE 2

4,000 g of a powder (particle size: not larger than 0.5 mm) of IBDU ® was charged into the same stirring-type granulator as used in Example 4. While spraying 680 g of water, a granulation operation was conducted in the same manner as in Example 4 to obtain granules having a particle size of from 2 to 4 mm. The granules thus obtained were dried in air at 80° C. for 3 hours to obtain comparative fertilizer 2.

EVALUATION TEST 1 (Physical properties as fertilizer)

With respect to fertilizers 1, 2, 3, 4 and 5 of the present invention and comparative fertilizers 1 and 2, the physical properties as fertilizer were measured in accordance with the following method, and the results are shown in Table 1.

(1) Breaking hardness

With respect to 20 granules of each fertilizer having a particle size of from 2.3 to 2.8 mm, the breaking hardness (kg/granule) was measured by means of a Kiya Hardness Testers. The breaking hardness was represented by the average value.

(2) Degree of breakage 500 g of each fertilizer was packed in a polyvinyl chloride bag and dropped naturally from a height of 2 m. This dropping operation was repeated 10 times for each bag, whereupon the weight of the powder (particle size: less than 0.5 mm) was measured. The degree of breakage was represented by the proportion of the weight of the powder relative to the initial weight of 500 g.

(3) Floating rate:

50 granules of each fertilizer were gently placed at the bottom of a 100 cc beaker, and about 50 cc of water was slowly introduced into the beaker whereupon the number of granules floated was counted and represented by the proportion relative to 50 granules.

As is evident from the results of the measurements of the physical properties as fertilizer, fertilizers 1 to 5 of the present invention have substantially high breaking hardness, substantially small degrees of breakage and no substantial floating properties as compared with comparative fertilizers 1 and 2, and thus they are excellent in the physical properties as fertilizer. If the floating rate is high, when such a fertilizer is used in a paddy field, it does not show the effectiveness. The fertilizers of the present invention are useful not only for upland fields but also for paddy fields.

TABLE 1

| | Physical properties as fertilizer | | |
|---|---|---|---|
| | Breaking hardness (kg/granule) | Degree of breakage (%) | Floating rate (%) |
| Fertilizer 1 | 2.0 | 0.2 | 0 |
| Fertilizer 2 | 2.3 | 0.2 | 0 |
| Fertilizer 3 | 1.2 | 1 | 5 |
| Fertilizer 4 | 1.5 | 0.5 | 0 |
| Fertilizer 5 | 1.9 | 0.2 | 0 |
| Comparative fertilizer 1 | Less than 0.1 | 10 | 100 |
| Comparative fertilizer 2 | Less than 0.1 | 12 | 100 |

EVALUATION TEST 2 (Fertilizing effects)

Using fertilizers 1 and 2 of the present invention and the powder (particle size: not larger than 0.5 mm) of IBDU ® as used in the Examples, the fertilizing effects of each fertilizer were measured in accordance with the following method.

(1) Test for conversion to inorganic nitrogen

Each sample under the paddy filed condition or the upland field condition adjusted as identified below, was maintained in a constant temperature tank of 25° C., whereby the change with time of the proportion of the amount of inorganic nitrogen to the amount of the charged nitrogen, was measured.

Paddy field condition

The proportions of water and a fertilizer added to diluvial soil (dry soil), were adjusted to be dry soil:-water:nitrogen derived from the fertilizer=200 g:350 g:60 mg.

Upland field condition

The proportions of water and a fertilizer added to a diluvial soil (dry soil), were adjusted to be dry soil:-water:nitrogen derived from the fertilizer=100 g:65% of the maximum water capacity:50 mg.

(2) Leaching test

A sample under a paddy field condition adjusted as identified below, was maintained at room temperature, whereby the change with time of the proportion of the amount of leaching nitrogen to the amount of the charged nitrogen, was measured.

Paddy field condition

Soil (diluvial soil:river sand=1 kg:2.5 kg) was charged into a 1/5,000 a Wagner pot, and water was poured so that the depth of water became 3 cm above the soil surface. Then, a fertilizer corresponding to 600 mg of nitrogen was added.

Figure 2:
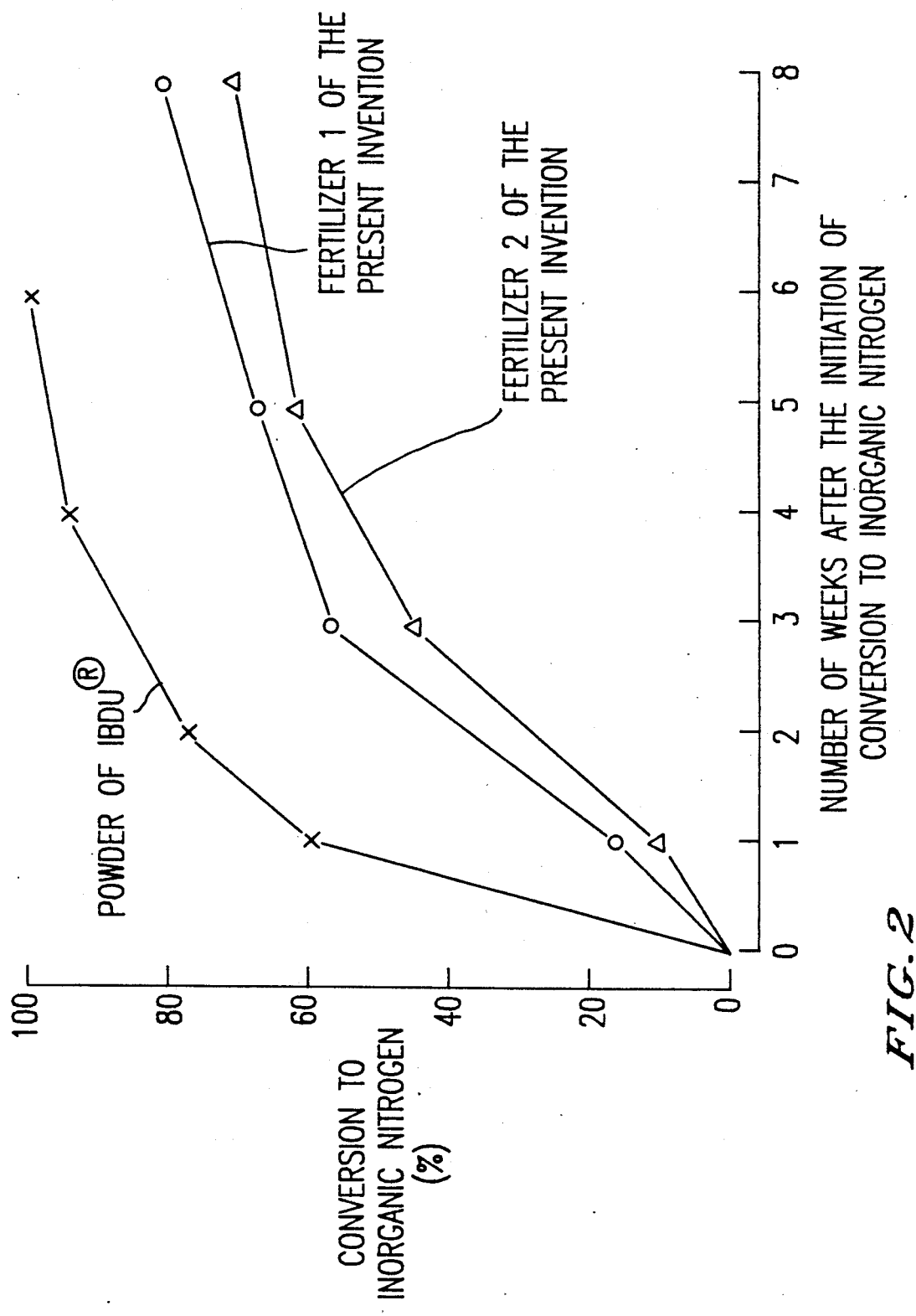
FIG. 2 is a graph showing the results of a test for conversion of nitrogen in a fertilizer to inorganic nitrogen under an upland field condition.
Figure 3:
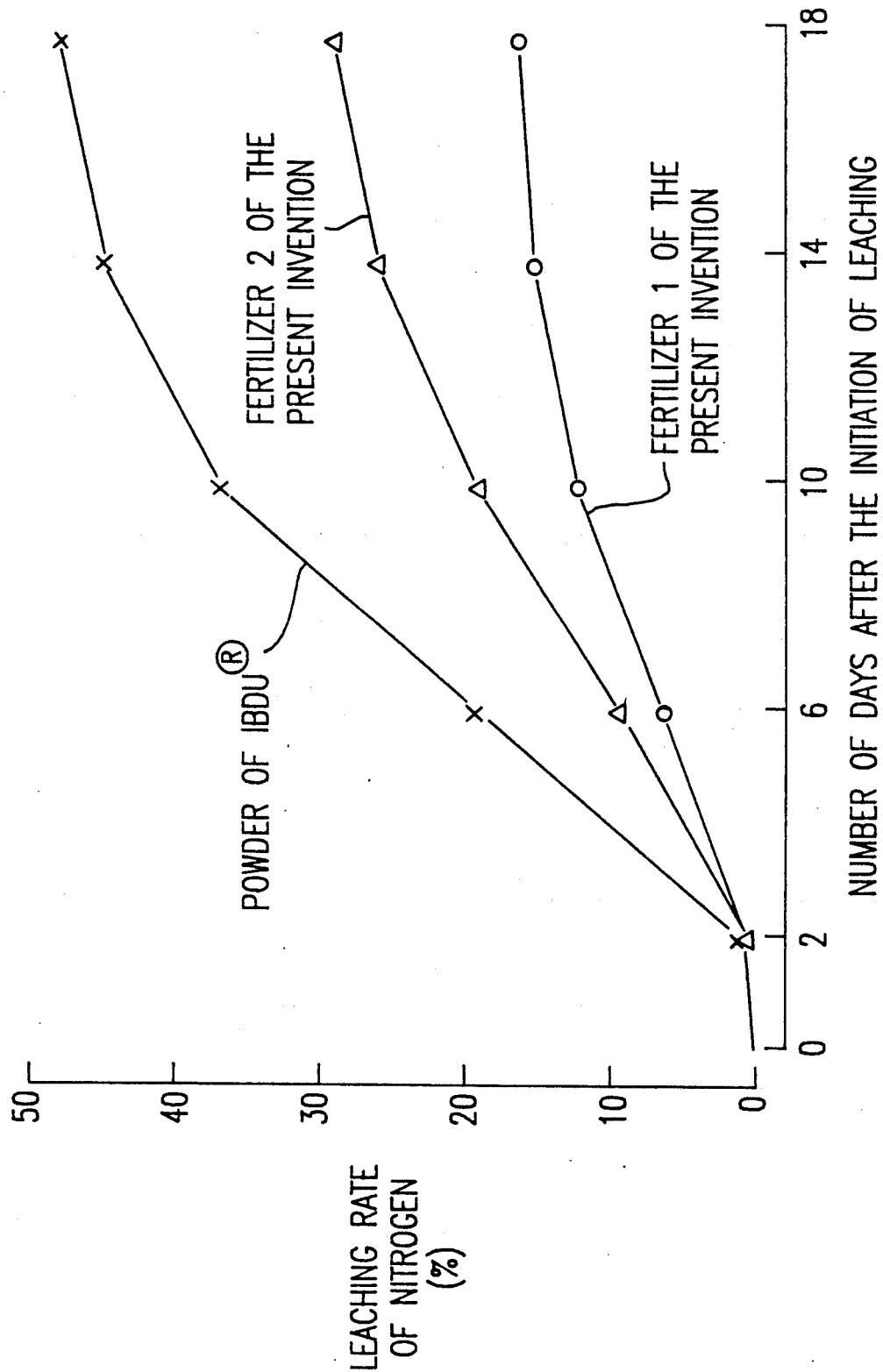
FIG. 3 is a graph showing the results of a test for leaching of nitrogen in a fertilizer under a paddy field condition.

The results of the above tests are shown in FIGS. 1, 2 and 3, respectively. FIG. 1 shows the results of the test for conversion of nitrogen in the fertilizer to inorganic nitrogen under the paddy field condition; FIG. 2 shows the results of the test for conversion of nitrogen in the fertilizer to inorganic nitrogen under the upland field condition; and FIG. 3 shows the results of the test for leaching of nitrogen in the fertilizer under the paddy field condition.

As is evident from the above results, when fertilizers 1 and 2 of the present invention are used, the rate for conversion to inorganic nitrogen is slow, and the amount of leaching is small as compared with the case where the powder of IBDU ® was used. This indicates that the fertilizers of the present invention have long effective period of fertilizing effects and thus are excellent in the fertilizing characteristics.

What is claimed is:

1. A process for producing a granular slow-acting nitrogenous fertilizer, which comprises blending an aqueous methylol urea solution with a condensate powder having a particle size of not larger than 1 mm selected from the group consisting of urea-isobutyraldehyde and a mixture of urea-isobutyraldehyde with urea-formaldehyde, and granulating the resulting blend while subjecting the methylol urea to dehydration condensation under an acidic condition to form a urea-formaldehyde condensate.

2. The process according to claim 1, wherein the urea-isobutyraldehyde condensate and/or a urea-formaldehyde condensate having a particle size larger than the particle size of the starting material urea-isobutyraldehyde condensate powder and urea-formaldehyde condensate power, is mixed with the starting material urea-isobutyraldehyde condensate powder and urea-formaldehyde condensate powder as nuclei for granulation, or the formed granular slow-acting nitrogenous fertilizer is mixed with the starting material urea-isobutyraldehyde condensate powder and urea-formaldehyde condensate powder as nuclei for granulation.

3. The process according to claim 1, wherein the particle sizes of the urea-isobutyraldehyde condensate powder and the urea-formaldehyde condensate powder are not larger than 0.7 mm.

4. The process according to claim 1, wherein the particle sizes of the urea-isobutyraldehyde condensate powder and the urea-formaldehyde condensate powder are not larger than 0.5 mm.

5. The process according to claim 1, wherein the molar ratio of urea/formaldehyde in the methylol urea is from 1 to 2.

6. The process according to claim 1, wherein the urea-formaldehyde condensate powder is used in an amount such that the weight ratio of the nitrogen derived from the urea-formaldehyde condensate powder to the nitrogen derived from the urea-isobutyraldehyde condensate powder is not more than 1.

7. The process according to claim 1, wherein the urea-formaldehyde condensate powder is used in an amount such that the weight ratio of the nitrogen derived from the urea-formaldehyde condensate powder to the nitrogen derived from the urea-isobutyraldehyde condensate powder is not more than 0.3.

8. The process according to claim 1, wherein the methylol urea is used in an amount of from 3 to 45% by weight relative to the urea-isobutyraldehyde condensate powder or the mixture thereof with a urea-formaldehyde condensate powder.

9. The process according to claim 1, wherein the methylol urea is used in an amount of from 5 to 25% by weight relative to the urea-isobutyraldehyde condensate powder or the mixture thereof with a urea-formaldehyde condensate powder.

10. The process according to claim 1, wherein the methylol urea is used in an amount such that the amount of the nitrogen derived from the methylol urea is from 3 to 30% by weight relative to the total nitrogen of the granular slow-acting nitrogenous fertilizer.

11. The process according to claim 1, wherein the methylol urea is used in an amount such that the amount of the nitrogen derived from the methylol urea is from 5 to 20% by weight relative to the total nitrogen of the granular slow-acting nitrogenous fertilizer.

12. The process according to claim 1, wherein the blend is granulated while the aqueous methylol urea solution is sprayed thereto.

13. The process according to claim 1, wherein the acidic condition is a pH of from 4.0 to 6.5.

14. The process according to claim 1, wherein phosphoric acid or citric acid is used as an acidic substance to make the acidic condition.

15. The process according to claim 1, wherein the temperature for granulation is not higher than 100° C. as the temperature of granules.

16. The process according to claim 1, wherein the temperature for granulation is not higher than 80° C. as the temperature of granules.

17. The process according to claim 1, wherein the granulation is conducted by means of a rolling-type or stirring-type granulator whereby a compression stress is exerted to granules.

18. The process according to claim 17, wherein the granulator is a dish-type granulator, a drum-type granulator or a stirring-type granulator.

19. The process according to claim 1, wherein the nitrogen derived from the urea-formaldehyde condensate is from 3 to 55% by weight relative to the total nitrogen in the granular slow-acting nitrogenous fertilizer.

20. The process according to claim 19, wherein the nitrogen derived from the urea-formaldehyde condensate is from 5 to 50% by weight relative to the total nitrogen in the granular slow-acting nitrogenous fertilizer.

21. The process according to claim 1, wherein the particle size of the granular slow-acting nitrogenous fertilizer is from 0.5 to 6 mm.

22. A process for producing a granular slow-acting nitrogenous fertilizer, which comprises supplying a urea-isobutyraldehyde condensate powder having a particle size of not larger than 1 mm or a mixture thereof with a urea-formaldehyde condensate powder having a particle size of not larger than 1 mm, to a rolling-type or stirring-type granulator whereby a compression stress is exerted to granules, and while spraying and blending thereto an aqueous methylol urea solution in an amount corresponding to from 3 to 45% by weight of methylol urea relative to the urea-isobutyraldehyde condensate powder or the mixture thereof with a urea-formaldehyde condensate powder and an aqueous solution of phosphoric acid or citric acid, respectively, granulating the resulting blend while subjecting the methylol urea to dehydration condensation at a pH of the reaction granulation system being within a range of from 4.0 to 6.5 at a temperature of not higher than 100° C. as the temperature of granules, to obtain a granular fertilizer having a particle size of from 0.5 to 6 mm, wherein the nitrogen derived from the urea-formaldehyde condensate is from 3 to 55% by weight relative to the total nitrogen.

23. The process according to claim 22, wherein a urea-isobutyraldehyde condensate and/or a urea-formaldehyde condensate having a particle size larger than the particle size of the starting material urea-isobutyraldehyde condensate powder and urea-formaldehyde condensate powder, is supplied to the granulator as nuclei for granulation, or the formed granular slow-acting nitrogenous fertilizer is recycled to the granulator as nuclei for granulation.

* * * * *